United States Patent
Reusser

[15] 3,696,165
[45] Oct. 3, 1972

[54] ISOBUTENE AND/OR ISOAMYLENES FROM CAT POLY GASOLINE

[72] Inventor: Robert E. Reusser, Bartlesville, Okla.

[73] Assignee: Phillips Petroleum Company

[22] Filed: June 1, 1970

[21] Appl. No.: 42,092

[52] U.S. Cl. ............................260/683 D, 260/683.2
[51] Int. Cl. .................................................C07c 3/62
[58] Field of Search ........................260/683 D, 683.2

[56] References Cited

UNITED STATES PATENTS 3,565,969   2/1971   Hutto et al. ................260/683
3,590,094   6/1971   Reusser et al. ............260/683

Primary Examiner—Delvert E. Gantz
Assistant Examiner—C. E. Spresser
Attorney—Young and Quigg

[57] ABSTRACT

The conversion of cat poly gasoline to isobutene using an olefin disproportionation reaction is increased by subjecting a heavier olefin fraction separated from the olefin disproportionation effluent to a high temperature treatment with MgO prior to recycle of said fraction to the olefin disproportionation reactor. In a preferred embodiment, isoamylenes are advantageously prepared using a second olefin disproportionation step which employs the isobutene-containing stream as the feedstock.

8 Claims, 2 Drawing Figures

PATENTED OCT 3 1972 3,696,165

INVENTOR.
R. E. REUSSER
BY Young & Quigg
ATTORNEYS

ISOBUTENE AND/OR ISOAMYLENES FROM CAT POLY GASOLINE

BACKGROUND OF THE INVENTION

1. Field of the Invention

This invention relates to the preparation of isobutene and/or isoamylenes. In a further aspect, the invention relates to olefin disproportionation.

2. Description of the Prior Art

The reaction of olefinic materials to produce other olefinic materials wherein the reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, and wherein the two new double bonds can be on the same or different molecules, has been called "the olefin reaction." The breaking and formation of these bonds can be visualized by using a mechanistic scheme involving a cyclobutane intermediate. Thus, two unsaturated pairs of carbon atoms combine to form a four-center (cyclobutane) intermediate which then dissociates by breaking either set of opposing bonds. This reaction can be illustrated by the following formulas:

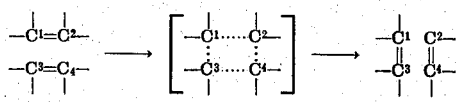

Other terms have been utilized to describe the reactions of olefinic materials which are within the scope of the olefin reaction as defined above. These include such terms as "olefin disproportionation," "olefin dismutation," "transalkylidenation," and "olefin metathesis." Throughout the specification and claims the term "olefin disproportionation" is used as a matter of choice and is deemed to be equivalent to the above-mentioned terms, including "the olefin reaction" terminology. Numerous catalyst systems have been reported which effect this reaction, including the catalysts of U.S. Pat. No. 3,261,879, Banks, (1966), and U.S. Pat. No. 3,365,513, Heckelsberg (1968).

Included among the reactions which fall within the scope of the term "olefin disporportionation," there is a reaction which employs ethylene as one of the reactants. That is, the ethylene can be one of the unsaturated pairs of carbon atoms which combines to form the four-center (cyclobutane) intermediate with another unsaturated pair of carbon atoms on a different and larger olefinic molecule. For example, ethylene and pentene-2 in the presence of an olefin disproportionation catalyst react to form butene-1 and propylene. Because of the fact that the larger molecule (pentene-2) has been broken to form the shorter molecules (butene-1 and propylene), this specific type of olefin disproportionation reaction has been called "ethylene cleavage." Another term which has been applied to this type of olefin reaction is "etheneolysis."

Isobutene and/or isoamylene are valuable intermediates in the preparation of rubbery polymers, e.g., polyisobutene and polyisoprene. Accordingly, the industry desires efficient methods of producing these materials using available feedstocks. One available feedstock is a mixture of predominantly branched olefins having at least six carbon atoms per molecule. This feedstock has been called "cat poly gasoline." Suitable methods are available for its direct preparation. For example, butenes and propylene can be cooligomerized in the presence of a suitable oligomerization catalyst to provide such a feedstock. This cat poly gasoline can be cleaved with ethylene in an olefin disproportionation reaction to yield substantial amounts of isobutene.

OBJECTS OF THE INVENTION

It is an object of this invention to prepare isobutene. It is a further object of this invention to prepare isoamylenes. Other objects and advantages of the invention will be apparent from a reading of the following disclosure and the appended claims.

SUMMARY OF THE INVENTION

We have discovered a method whereby isobutene can be prepared from cat poly gasoline by subjecting the cat poly gasoline feedstock to cleavage in the presence of an olefin disproportionation catalyst. The cleaving olefin may be ethylene and/or propylene. The effluent from the cleavage reaction is subjected to a separation step in order to provide a stream of $C_4$ olefins containing a substantial amount of isobutene and a stream comprising hydrocarbons which are heavier than isobutene which is recycled to the cleavage step. Unexpectedly, we have found that the conversion of the cat poly gasoline to isobutene can be increased if the heavier olefin fraction is recycled to the cleavage reactor after contact with a magnesium oxide catalyst at a suitable high temperature followed by deoiling of the contacted stream in a distillation column.

Further, in accordance with the invention, we have discovered that isoamylenes can be prepared in high conversions by subjecting the $C_4$ olefin stream containing isobutene and butene-2 to a second olefin disproportionation step. The olefin disproportionation reaction of the $C_4$ olefin stream is accomplished in the absence of a cleaving olefin and produces isoamylenes. The effluent from the second disproportionation step is then passed to a separation zone wherein isoamylenes are recovered as product, and an olefin stream comprising materials heavier than the isoamylenes is recycled to the cleavage unit of the first step.

DETAILED DESCRIPTION OF THE INVENTION

The significant advantage of the invention is that the ultimate conversion of the cat poly gasoline to the desired product (isobutene and/or isoamylenes), is substantially increased by contacting the heavier olefin fraction from the separation zone with magnesium oxide of relatively high temperature and then deoiling the treated material. Although it is not completely understood why the conversion is thus increased, it is believed that when olefin feedstreams containing a broad variety of olefin materials are subjected to ethylene cleavage, ultimate conversion is retarded due to the presence of certain highly branched structures within the olefinic materials. These highly branched olefinic materials are believed to be resistant to the ethylene cleavage reaction. In addition, it is believed possible that certain materials are generated within the process which act as poisons on the disproportionation catalyst. In any event, the passage of the recycle stream containing the resistant branched heavier olefin materials or the materials generated within the process through a hot zone containing MgO followed by deoiling, renders the recycle stream more susceptible to the cleavage reaction, thus increasing the conversion of cat poly gasoline to isobutene and/or isoamylenes.

Figure 1:
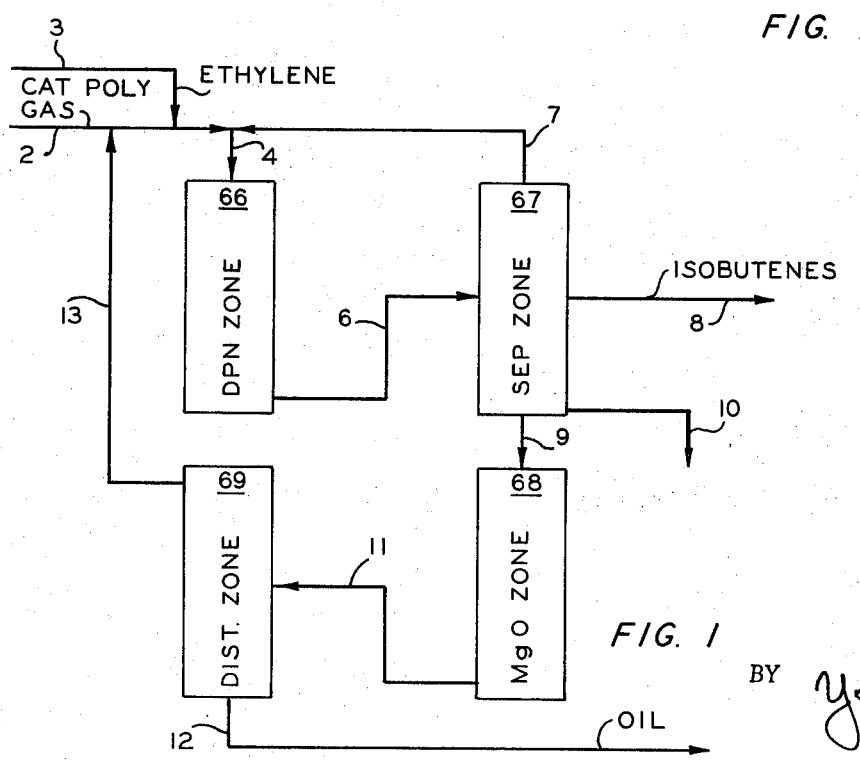
FIG. 1 of the drawing is a schematic flow diagram of the process of the invention illustrating the preparation of isobutene from cat poly gasoline.

The invention can best be understood by reference to the drawings. In FIG. 1, cat poly gasoline in line 2 is blended with suitable quantities of ethylene (and/or propylene) from line 3, and introduced via line 4 into olefin disproportionation (DPN) zone 66. The cleavage reaction within zone 66 provides an effluent comprising ethylene, propylene, n-butenes, isobutenes, and some amylenes, as well as incompletely converted feed materials. The effluent from zone 66 is conducted via line 6 to separation zone 67 wherein ethylene and propylene are separated and recycled via line 7 to the ethylene cleavage zone 66. The isobutene and butene-olefin fraction is separated and recovered via line 8. Any undesirable heavy materials can be removed by way of line 10.

A $C_5+$ olefin fraction from separation zone 67 comprising unconverted cat poly gasoline is removed via line 9 and passed into zone 68 and contacted with catalytic MgO at elevated temperatures. Subsequent to treatment in zone 68, the $C_5+$ olefin fraction is withdrawn via line 11 and passed to distillation zone 69. Within distillation zone 69, the $C_5+$ olefin fraction is deoiled, the oil being removed from the system by way of line 12. The deoiled $C_5+$ effluent passes from zone 69 via line 13 and is returned to stream 2 for recycle via line 4 into the cleavage zone 66.

Figure 2:
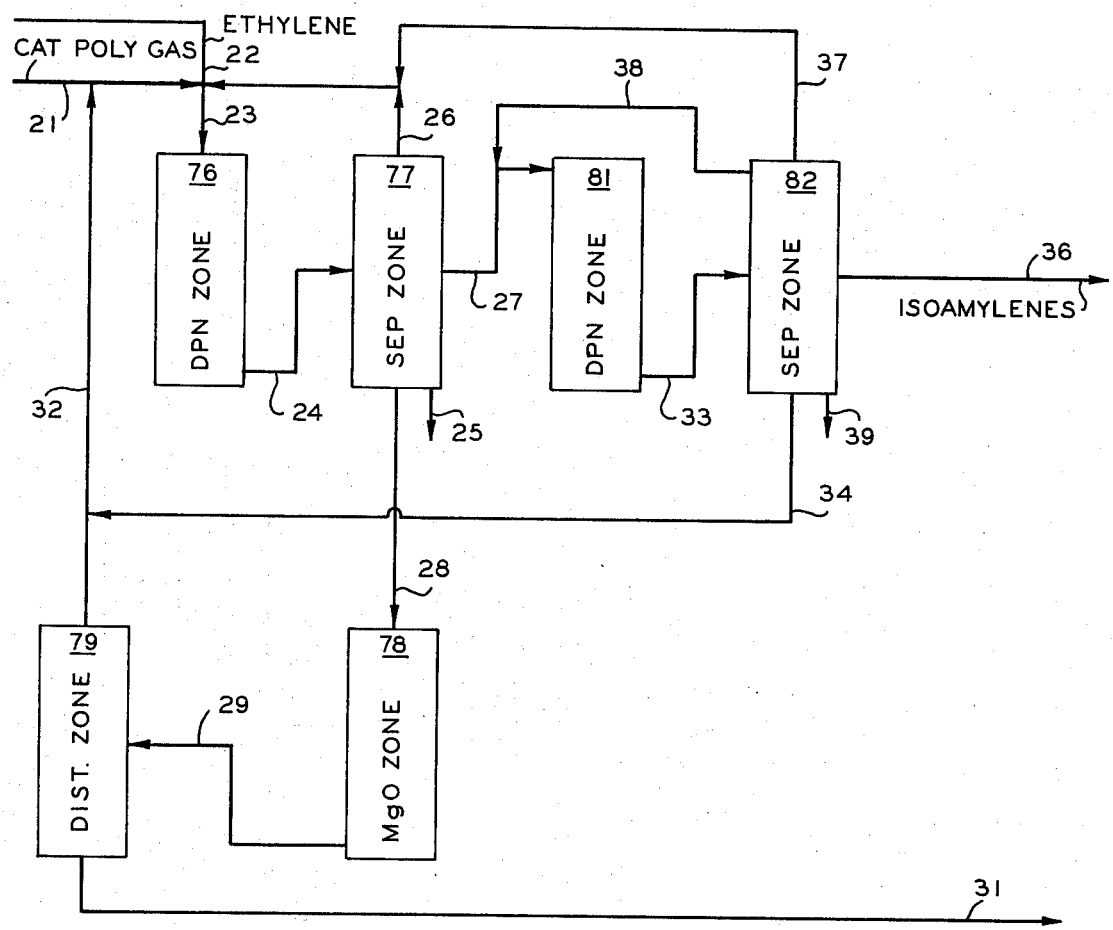
FIG. 2 of the drawing is a schematic flow diagram of the process of the invention illustrating the preparation of isoamylenes from cat poly gasoline.

FIG. 2 of the drawing illustrates a process wherein isoamylenes are prepared utilizing the hot MgO treatment described above and an additional olefin disproportionation unit to convert isobutene and butenes to isoamylenes. Cat poly gasoline in line 21 is combined with ethylene (and optionally propylene) from line 22 in line 23 and subjected to cleavage within olefin disproportionation (DPN) zone 76. The effluent from zone 76 in line 24 is passed to separation zone 77 wherein ethylene and propylene are removed and recycled via line 26 to the ethylene cleavage unit 76. A $C_5+$ olefin fraction is removed from zone 77 via line 28 and subjected to the hot MgO treatment within zone 78. The treated $C_5+$ olefin fraction is removed from zone 78 via line 29 and passed to distillation zone 79 wherein the MgO treated fraction is subjected to deoiling conditions. Oily products of the MgO treatment are removed from distillation zone 79 via 31. The deoiled $C_5+$ olefin fraction is removed from zone 79 via 32 and returned to the cleavage unit 76 via lines 32, 21, and 23. Any undesirable heavy materials which are formed within unit 76 are removed from separation zone 77 via line 25.

A stream comprising a substantial amount of isobutenes, butenes, and optionally some propylene, is conducted via lines 27 to olefin disproportionation (DPN) zone 81. Therein, the olefin disproportionation reaction of isobutene and butene-2 produces substantial quantities of isoamylene. The reaction of isobutene and propylene produces additional quantities of isoamylenes. The effluent from the reactor 81 is conducted via line 33 into separation zone 82 wherein propylene and ethylene are separated and recycled to ethylene cleavage zone 76 by way of lines 37 and 26. Unconverted isobutene and normal butenes are returned from zone 82 via lines 38 and 27 to reaction zone 81. A $C_6+$ olefin fraction is removed from the separation area 82 by way of line 34 and returned to ethylene cleavage zone 76 via lines 32, 21, and 23. As in separation area 77, any undesirable heavy materials can be removed from the system via line 39.

Product isoamylenes are recovered from zone 82 through line 36. If desired, the $C_6+$ fraction from separation zone 82 can be combined with the $C_5+$ fraction from separation area 77 and treated with the hot MgO in zone 78.

Magnesium oxide is known to be a double bond isomerization catalyst, and, as discussed in more detail hereinbelow, it is used in this capacity in the present invention process to facilitate the olefin cleavage reaction step by being used in conjunction with a solid olefin disproportionation catalyst. Catalytic MgO is not known to have appreciable skeletal isomerization activity. It has also been found that when liquid materials such as hydrocarbons are percolated through a bed of magnesium oxide, some purification of the hydrocarbon stream is obtained, presumably by adsorption. The purification treatment using magnesium oxide is ordinarily carried out at relatively low temperatures, such as room temperatures, and can be used in the process of the invention to extend or preserve the life of the olefin disproportionation catalyst against poisons which can be present in the virgin cat poly gasoline feed.

It was surprising, however, that the processability of the $C_5+$ olefin recycle streams can be further improved with respect to the olefin cleavage reaction by treatment with magnesium oxide at high temperatures followed by deoiling of the stream. It was observed that the effluent from a high temperature magnesium oxide treatment was somewhat yellow in color. The yellow colored material was much less volatile than the bulk of the olefinic material in the treated stream. Thus, it was found that the magnesium oxide high temperature treatment coupled with a deoiling treatment provided a very beneficial effect by increasing the conversion to the desired product olefins when this stream was recycled to the olefin cleavage reaction subsequent to the treatment.

The high temperature magnesium oxide treatment can use any suitable contacting technique such as fixed bed or fluidized be reactors. The magnesium oxide can be in any suitable catalytic form ranging from a fine powder to prills or tablets. The magnesium oxide which is the preferred agent for use in the treatment step of the invention is the activated catalytic material which is known in the art. That is, the material has a surface area of at least about 1m²/g and has been suitably activated by heat treatment. The magnesium oxide can be obtained from naturally occurring materials, such as the mineral Brucite, or can be synthetically prepared by known methods. Minor amounts of other materials such as silica or alumina can be present, but the material is principally magnesium oxide. The magnesium oxide is activated and/or regenerated by heating in flowing air at 800°–1,400° F for about 0.1 to about 20 hours. The activation treatment in air can be followed, if desired, by heating in other gases such as, for example, nitrogen, argon, carbon monoxide, and the like.

The magnesium oxide high temperature treatment of the $C_5+$ olefin recycle stream is carried out at a temperature in the range of from about 500° to about 900° F, at any suitable pressure in the range of from about 0 to about 2,000 psig, and at a weight hourly space velocity in the range of from about 1 to about 100, preferably 3–20 WHSV. In the deoiling step which follows the magnesium oxide treatment, the treated material is distilled in any suitable way such that the lighter, more reactive olefins are separated from the relatively nonvolatile undesirable materials. Ordinarily, about 80 to about 95 percent, preferably about 90 to 95 percent, of the treated material is carried overhead, the remainder being left behind in the bottoms and discarded.

Any catalyst having activity for converting olefins in accordance with the above-described olefin disproportionation reaction can be employed for the olefin disproportionation steps of the invention. These catalysts include both heterogeneous catalysts which are capable of olefin disproportionation activity in the presence or absence of a liquid hydrocarbon solvent and homogeneous catalysts which require the presence of a hydrocarbon diluent during the reaction. Of course, where the feed olefin is liquid under normal reaction conditions, it can function as a diluent for the homogeneous catalyst. For the olefin disproportionation steps of this invention, particularly for the first disproportionation step, the heterogeneous catalysts are preferred.

The heterogeneous catalysts which are particularly suitable for the process of the invention include tungsten oxide on silica, tungsten oxide on alumina, molybdenum oxide on alumina, rhenium oxide on alumina, rhenium oxide on aluminum phosphate, molybdenum oxide on aluminum phosphate, and molybdenum hexacarbonyl on alumina. These catalysts are the subject of U.S. Pat. No. 3,261,879 (Banks) of July 19, 1966; U.S. Pat. No. 3,365,513 (Heckelsberg) of Jan. 23, 1968; British Pat. No. 1,054,864 (British Petroleum) of Jan. 11, 1967; U.S. Pat. No. 3,463,827 (Banks) of Aug. 26, 1969; and U.S. application Ser. No. 846,977, filed Aug. 1, 1969, now abandoned.

The preparation, activation, and maintenance of the heterogeneous olefin disproportionation catalysts are known in the art, and with reference to the specific systems as discussed above, are disclosed in the above-mentioned patents and applications. The various solid catalysts exhibit different optimum reaction temperatures, pressures, and contact times for the olefin disproportionation reaction. Accordingly, the specific reaction temperature, pressure, and contact time for the disproportionation reaction employed in the process of the invention is easily within the skill of one in the art.

Any of the above-mentioned heterogeneous catalysts, when employed in the olefin cleavage reaction step of the invention, preferably employs a suitable double bond isomerization catalyst such as magnesium oxide in combination with the olefin disproportionation catalyst. The magnesium oxide can be suitably comingled with the solid olefin disproportionation catalyst and employed in a single olefin cleavage reactor. The magnesium oxide in combination with the olefin disproportionation catalyst functions as a double bond isomerization catalyst within the olefin reaction zone and facilitates the olefin cleavage step. Other suitable combination catalysts are disclosed in copending applications Ser. No. 627,635, Banks, filed Apr. 3, 1967, now abandoned, Ser. No. 678,499, filed Oct. 27, 1967, now abandoned, and Ser. No. 678,489, filed Oct. 27, 1967.

Before contact with the disproportionation catalyst in the first catalytic zone, the cat poly gasoline is blended with ethylene and/or propylene in proportions which can range from about 1 to about 20, preferably from 4 to about 10 mols of ethylene and/or propylene per mol of feed olefin.

The catalysts employed in the second olefin disproportionation step of the invention, i.e., the disproportionation of the $C_4$ olefin-containing stream, can be any of the above-mentioned catalysts. Although magnesium oxide can be used in conjunction with the solid olefin disproportionation catalyst, it is presently preferred not to use the MgO combination catalyst in this step of the invention.

The separation steps have been simplified in the FIGURES of the drawing and can, in actual operation, represent a number of consecutive separation means such as fractionation and distillation columns and the like. Any convenient sequence of separation steps can be used. For the sake of brevity, the drawings have excluded such apparatus as pumps, heat exchangers, valves, and the like.

Except for the quantity of high boiling material discarded from the high temperature magnesium oxide treatment, there are no significant by-products from the process.

Paraffinic materials which may be formed in the process of the invention, can be removed at any convenient point in the process together with any paraffins which may have been present in the feedstock. In addition, it has been found to be generally advantageous to deoil the feed prior to entering any catalytic stage of the process. This is done to minimize the accumulation and carry-over of small amounts of materials which might poison or otherwise shorten the life of the catalyst. Accordingly, the process may contain other deoiling units in addition to the one following the magnesium oxide high temperature purification unit.

The invention is illustrated by the following examples, which are for the purpose of illustration only, and should not be construed as limiting the scope of spirit of the invention as described hereinabove.

EXAMPLE I

A $C_5+$ recycle olefin stream obtained from the ethylene cleavage of cat poly gas (a $C_6+$ olefin stream obtained by the catalytic co-oligomerization of propylene and butenes) was treated according to the process of the invention to render it more reactive on further passage through the catalytic cleavage zone.

A MgO-containing bed was prepared by charging 25 g of a − 20 + 65 mesh catalytic grade magnesia in a tubular steel reactor and activating it at 1,000° F in flowing air for 1 hour. It was then contacted in flowing CO for 15 minutes and then cooled to 750° F. under CO. The above $C_5+$ recycle olefin stream was first percolated through an adsorption bed of $MgO/SiO_2$ at room temperature and then passed through the MgO bed at 750° F, at atmospheric pressure, and at a weight hourly space velocity of about 5.

About 2 liters of the yellow-colored effluent were collected and distilled to an overhead temperature of 145° C and a pot temperature of 167° C, at atmospheric pressure. About 90 percent of the effluent was taken overhead, while the yellow color was essentially left behind. The effluent was distilled because its yellow color could not readily be removed by percolation through the customary adsorption beds of MgO/mole-sieve, or silica gel.

The ethylene cleavage of the above-treated olefin mixture was carried out at 700° F, at 400 psig, at a 26 WHSV, and at an ethylene: defin ratio of 4:1 by passing the material through a mixed catalyst bed comprising 1.8 g of −20+60 mesh $WO_3/SiO_2$ olefin disproportionation catalyst and 6.80 g −20+60 mesh MgO double bond isomerization catalyst. Another bed containing 3.5 g of the MgO immediately preceded the mixed bed. The catalytic beds were activated by heating at 1,000° F in flowing air for 3 hours, followed by flowing CO for 15 minutes, and then cooled to the 700° F operating temperature. The feed was percolated at room temperature through an adsorption bed of MgO/mole sieve before being passed into the reaction zone.

For purposes of comparison, another portion of the $C_5+$ recycle olefin mixture was also cleaved with ethylene under essentially the same conditions except that it was not given the 750° F treatment with MgO nor the subsequent distillation.

The effluents from these two cleavage runs were collected and/or sampled at selected intervals and analyzed. The results are shown in the following Table I.

TABLE I

| | Control | Invention | | |
|---|---|---|---|---|
| On Stream Time, hrs. | 1½–2   4½–5 | 1 | 3 | 4½ |
| Conversion, % (1) | 40     35 | 51 | 45 | 43 |

(1) Conversion of $C_6+$ olefins to $C_5$ and lighter olefins.

The data in the above table show that treatment of the recycle stream according to the process of the invention results in greater conversion and the increase in conversion persists throughout the cycle of catalyst life.

The following illustrative examples are presented for the purpose of illustrating the overall process of the invention. In the absence of actual plant runs, the material balances presented herein have been calculated to show the process of the invention.

ILLUSTRATIVE EXAMPLE I

Cat poly gas is converted to isobutene and butenes in accordance with the process as depicted in FIG. 1. Olefin cleavage unit 66 employs a tungsten oxide on silica olefin disproportionation catalyst in combination with magnesium oxide. The weight ratio is 5:1 magnesium oxide to tungsten oxide on silica. The reaction temperature is 700° F, the pressure is 400 psig, and the weight hourly space velocity is 26. The ratio of ethylene to feed olefins in the cat poly gas in zone 66 is maintained at 4:1 on a molar basis. The high temperature zone 68 employs MgO as the catalyst and the temperature in that zone is 750° F, the pressure is ambient, and the weight hourly space velocity is 5. The composition of the various streams of the process are summarized below in Table II in terms of weight parts per hour.

TABLE II
wt. parts/hr

| Stream # | 2 | 3 | 4 | 6 | 7 | 8 | 9 | 11 | 12 | 13 |
|---|---|---|---|---|---|---|---|---|---|---|
| Cat Poly Gas | 27.65 | | 27.65 | | | | | | | |
| Ethylene | | 8.47 | 36.40 | 27.93 | 27.93 | | | | | |
| Propylene | | | 13.60 | 13.63 | 13.60 | | | | | |
| Isobutane | | | | 0.06 | | 0.06 | | | | |
| n-Butane | | | | 0.06 | | 0.06 | | | | |
| Butene-1 | | | | 3.08 | | 3.08 | | | | |
| Isobutene | | | | 18.58 | | 18.58 | | | | |
| c-Butene-2 | | | | 5.06 | | | | | | |
| c-Butene-2 | | | | 5.06 | | 5.06 | | | | |
| Isopentane | | | 0.06 | 0.06 | | | 0.06 | 0.06 | | 0.06 |
| 3-Methylbutene-1 | | | 1.26 | 1.26 | | | 1.26 | 1.26 | | 1.26 |
| n-Pentane & Butadiene | | | 0.15 | 0.15 | | | 0.15 | 0.15 | | 0.15 |
| Pentene-1 | | | 0.07 | 0.07 | | | 0.07 | 0.07 | | 0.07 |
| 2-Methylbutene-1 | | | 1.17 | 1.17 | | | 1.17 | 1.17 | | 1.17 |
| t-Pentene-2 | | | 2.21 | 2.21 | | | 2.21 | 2.21 | | 2.21 |
| c-Pentene-2 | | | | | | | | | | |
| 2-Methylbutene-2 | | | 2.85 | 2.85 | | | 2.85 | 2.85 | | 2.85 |
| $C_5+$ olefins | | | 14.58 | 16.93 | | | 16.93 | 16.93 | 2.35 | 14.58 |
| Total | 27.65 | 8.57 | 100 | 100 | 41.53 | 33.74 | 24.70 | 24.70 | 2.35 | 22.35 |

The process as depicted in FIG. 1 of the drawing provides 18.58 wt. parts per hour of isobutene and 15.04 wt. parts per hour of butenes, based on a charge rate of 27.65 parts per hour cat poly gasoline and 8.47 wt. parts per hour of ethylene.

ILLUSTRATIVE EXAMPLE II

Isoamylenes are prepared using a process of the invention as is depicted in FIG. 2 of the drawing. Olefin cleavage reactor 76 employs a tungsten oxide on silica olefin disproportionation catalyst in combination with magnesium oxide which is identical to that employed in Illustrative Example I above, in reactor 66. The high temperature magnesium oxide zone 78 employs the same catalyst and the same conditions as zone 68 in Illustrative Example I with the exception that the temperature is 775° F. Olefin disproportionation zone 81 employs a tungsten oxide on silica catalyst and operates at a temperature of 842° F, a pressure of 300 psig, and a weight hourly space velocity of 100. The composition of the various stream of the process are summarized in Table III below in terms of weight parts per hour.

TABLE III wt. parts/hr

| stream No. | 21 | 22 | 23 | 24 | 25 | 26 | 27 | 28 | 29 |
|---|---|---|---|---|---|---|---|---|---|
| Cat Poly Gas | 15.76 | | | 15.76 | | | | | |
| Ethylene | | 13.51 | 33.54 | 15.93 | | 15.93 | | | |
| Propylene | | | 16.93 | 17.63 | | | 17.63 | | |
| Butene-1 | | | | 3.08 | | | 3.08 | | |
| Isobutene | | | | 22.58 | | | 22.58 | | |
| t-Butene-2 | | | | 7.02 | | | 7.02 | | |
| c-Butene-2 | | | | 5.06 | | | 5.06 | | |
| Isopentane | | | 0.06 | 0.06 | | | | 0.06 | 0.06 |
| 3-Methyl-butene-1 | | | 3.26 | 3.26 | | | | 3.26 | 3.26 |
| n-Pentane & Butadiene | | | 0.15 | 0.15 | | | | 0.15 | 0.15 |
| Pentene-1 | | | 0.07 | 0.07 | | | | 0.07 | 0.07 |
| 2-Methyl butene-1 | | | 3.17 | 3.17 | | | | 3.17 | 3.17 |
| t-Pentene-2 | | | 2.21 | 2.21 | | | | 2.21 | 2.21 |
| c-Pentene-2 | | | nil | nil | | | | nil | nil |
| 2-Methyl butene-2 | | | 2.85 | 2.85 | | | | 2.85 | 2.85 |
| C$_6$+ olefins | | | 22.00 | 16.93 | | | | 15.83 | 14.58 |
| Heavies | | | | | 1.10 | | | | 1.25 |
| total | 20.28 | 15.07 | 100 | 100 | 1.10 | 15.93 | 55.37 | 27.60 | 27.60 |

| Stream No. | 31 | 32 | 33 | 34 | 36 | 37 | 38 | 39 |
|---|---|---|---|---|---|---|---|---|
| Cat Poly Gas | | | | | | | | |
| Ethylene | | | 4.10 | | | 4.10 | | |
| Propylene | | | 16.93 | | | 16.93 | | |
| Butene-1 | | | 1.69 | | | | 1.69 | |
| Isobutene | | | 12.42 | | | | 12.42 | |
| t-Butene-2 | | | 3.86 | | | | 3.86 | |
| c-Butene-2 | | | 2.78 | | | | 2.78 | |
| Isopentane | | 0.06 | | | | | | |
| 3-Methyl-Butene-1 | | 3.26 | 3.85 | | 3.85 | | | |
| n-pentane & Butadiene | | 0.15 | | | | | | |
| Pentene-1 | | 0.07 | | | | | | |
| 2-Methyl-butene-1 | | 3.17 | 7.32 | | 7.32 | | | |
| t-Pentene-2 | | 2.21 | 0.70 | | 0.70 | | | |
| c-Pentene-2 | | nil | 0.30 | | 0.30 | | | |
| 2-methyl-butene-2 | | 2.85 | 12.25 | | 12.25 | | | |
| C$_6$+ olefins | | 22.00 | 7.42 | 7.42 | | | | |
| Heavies | 1.25 | | 2.50 | | | | | 2.50 |
| Total | 1.25 | 33.77 | 76.12 | 7.42 | 24.42 | 21.03 | 20.75 | 2.50 |

The above table illustrates that 3.85 weight parts per hour 3-methylbutene-1, 7.32 wt. parts per hour of 2-methylbutene-1, and 12.25 wt. parts per hour of 2-methylbutene-2 are produced based on a charge of 15.76 wt. parts per hour of cat poly gasoline and 13.51 wt. parts per hour of ethylene.

Reasonable modification and variation in the invention as described herein is possible without departing from the spirit and scope thereof.

I claim:

1. In a process for the preparation of isobutene which comprises contacting in a first reaction zone cat poly gasoline and ethylene or propylene in the presence of an olefin disproportionation catalyst suitable to cause the olefin cleavage of the cat poly gasoline to produce a stream comprising said isobutene and a stream comprising olefin hydrocarbons heavier than isobutene, the improvement comprising contacting the stream comprising olefin hydrocarbons heavier than isobutene with magnesium oxide at a temperature in the range of from about 500° to about 900° F and subsequently deoiling the magnesium oxide-treated stream, and returning the treated stream to said first reaction zone.

2. The process of claim 1 wherein the contact of the stream comprising olefin hydrocarbons heavier than isobutene with magnesium oxide is accomplished at a pressure of from about 0 to about 2,000 psig, at a weight hourly space velocity of from about 1 to about 100.

3. The process of claim 2 wherein the deoiling of the magnesium oxide-treated stream is accomplished in a distillation zone wherein from about 80 to about 95 percent of the treated stream is taken overhead and returned to the first reaction zone.

4. The process of claim 3 wherein the magnesium oxide is activated prior to contact with the heavier olefin stream by heating in flowing air to a temperature of from about 800° to about 1,400° F for a period of from about 0.1 to about 20 hours.

5. The process of claim 1 wherein the stream comprising isobutene contains ethylene and butene-2, said ethylene is separated from the stream comprising isobutene, and the resulting ethylene deficient stream is contacted in a second reaction zone with an olefin disproportionation catalyst to produce a stream comprising isoamylenes and a stream comprising olefinic hydrocarbons heavier than isoamylenes, the latter stream being returned to the first reaction zone.

6. The process of claim 5 wherein the stream comprising olefinic hydrocarbons heavier than isoamylenes is contacted with hot magnesium oxide prior to returning the stream to the first reaction zone.

7. The process of claim 6 wherein the stream comprising olefinic hydrocarbons heavier than isoamylenes is admixed with the stream comprising olefinic hydrocarbons heavier than isobutene prior to the latter stream being contacted with the hot magnesium oxide.

8. The process of claim 7 wherein said ethylene is returned to the first reaction zone, and the stream comprising isoamylenes also contains isobutene, butenes, and propylene, and the isobutenes, butenes, and propylene are separated from the isoamylenes and returned to the second reaction zone.

* * * * *